US006298838B1

(12) United States Patent
Huff et al.

(10) Patent No.: US 6,298,838 B1
(45) Date of Patent: Oct. 9, 2001

(54) ETHANOL CONTENT LEARNING BASED ON ENGINE ROUGHNESS

(75) Inventors: Shean P Huff, Ann Arbor; John M Prevost, Spring Arbor, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/552,390

(22) Filed: Apr. 19, 2000

(51) Int. Cl.⁷ .................................................. F02D 41/00
(52) U.S. Cl. ............................................ 123/674; 123/575
(58) Field of Search .................................. 123/674, 575, 123/436, 480, 1 A, 497

(56) References Cited

U.S. PATENT DOCUMENTS

| | | | |
|---|---|---|---|
| 5,400,762 | * 3/1995 | Fodale et al. | 123/690 |
| 5,467,755 | * 11/1995 | Konrad et al. | 123/674 |
| 5,520,162 | * 5/1996 | Rotramel et al. | 123/689 |
| 5,868,117 | 2/1999 | Moote et al. | 123/486 |
| 5,901,671 | 5/1999 | Huff et al. | 123/1 A |
| 5,950,599 | * 9/1999 | Rotramel et al. | 123/436 |

* cited by examiner

Primary Examiner—Henry C. Yuen
Assistant Examiner—Mahmoud Gimie
(74) Attorney, Agent, or Firm—Mark P. Calcaterra

(57) ABSTRACT

A method according to the present invention controls engine roughness by varying the ethanol content in a fuel mixture of a flexible fuel vehicle. Initially, a trigger threshold and fix threshold are established based on engine speed and manifold pressure. The fix threshold is less than the trigger threshold. A first ethanol amount is delivered to the fuel mixture if a first measured roughness is greater than the trigger threshold. A second measured engine roughness is determined after delivering the first ethanol amount. The delivery of the first ethanol amount is stopped if the second measured roughness is greater than the trigger threshold. A second ethanol amount is delivered if the second measured roughness is less than the trigger threshold but greater than the fix threshold. A third measured roughness is then determined. Delivery of the second ethanol amount is stopped if the third measured roughness is greater than the trigger threshold. The roughness is measured and ethanol delivery modified accordingly so long as the third measured roughness is less than the trigger threshold and greater than the fix threshold.

16 Claims, 2 Drawing Sheets

ETHANOL CONTENT LEARNING BASED ON ENGINE ROUGHNESS

BACKGROUND OF THE INVENTION

The present invention relates generally to fuel control systems, and more particularly, to a method of determining and adjusting the concentration of ethanol content of the fuel in a flexible fueled vehicle.

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is desired. Modifications to the air/fuel mixture are necessary when switching operation of the vehicle from one fuel value to another. Air/fuel ratio in an internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, because too much fuel is being burned in proportion to the amount of air required to achieve perfect combustion. Conversely, if the air/fuel ratio is greater than stoichiometric, an engine is said to be operating lean because too much air is being burned in proportion to the amount of fuel required to achieve perfect combustion. Alcohol fuels have a lower air/fuel ratio than gasoline of stoichiometric; accordingly, the engine must be compensated for in the rich direction as a percentage of alcohol in the fuel increases.

In the absence of a fuel composition sensor, the alcohol concentration is determined using the exhaust gas oxygen feedback system. Under some cold starting conditions, the oxygen sensor, however, is incapable of being used for air/fuel ratio corrections. Oxygen sensors take a predetermined amount of time to warm up to a reliable state, particularly on cold starts. However, under some cold starting conditions, learning the ethanol concentration is desired.

The engine roughness, as measured by the second derivative of the engine speed, can be used to indicate lean fuel operation, and therefore can be used to determine the extent of which the air/fuel mixture needs to be enriched to protect driveability. However, variations in engine roughness caused by manifold air pressure (MAP) and engine speed (RPM) changes must also be considered to accurately determine the cause of engine roughness, otherwise a lean operation may be mistaken for true engine misfire, and also true engine misfire could be mistaken for a lean operating condition. Either of these conditions could negatively affect driveability. Therefore, it would be desirable to provide a method for determining the percent alcohol content of fuel by measuring engine roughness associated with MAP and RPM changes, and adding fuel to minimize engine roughness during the transition from one fuel mixture to another.

SUMMARY OF THE INVENTION

A method according to the present invention controls engine roughness by varying the ethanol content in a fuel mixture of a flexible fuel vehicle. Initially, a trigger threshold and fix threshold are established based on engine speed and manifold air pressure. The fix threshold is less than the trigger threshold. The normal fuel delivery is incremented by a first ethanol amount if a first measured roughness is greater than the trigger threshold. A second measured engine roughness is determined after incrementing the fuel delivery by the first ethanol amount. Normal fuel delivery is resumed if the second measured roughness is greater than the trigger threshold. The fuel delivery is incremented by a second ethanol amount if the second measured roughness is less than the trigger threshold but greater than the fix threshold. A third measured roughness is then determined after incrementing the fuel delivery by a second ethanol amount. Normal fuel delivery is resumed if the third measured roughness is greater than the trigger threshold. Otherwise, the fuel delivery is continuous, without any additional increments or decrements, so long as the third measured roughness is less than the trigger threshold and less than the fix threshold.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
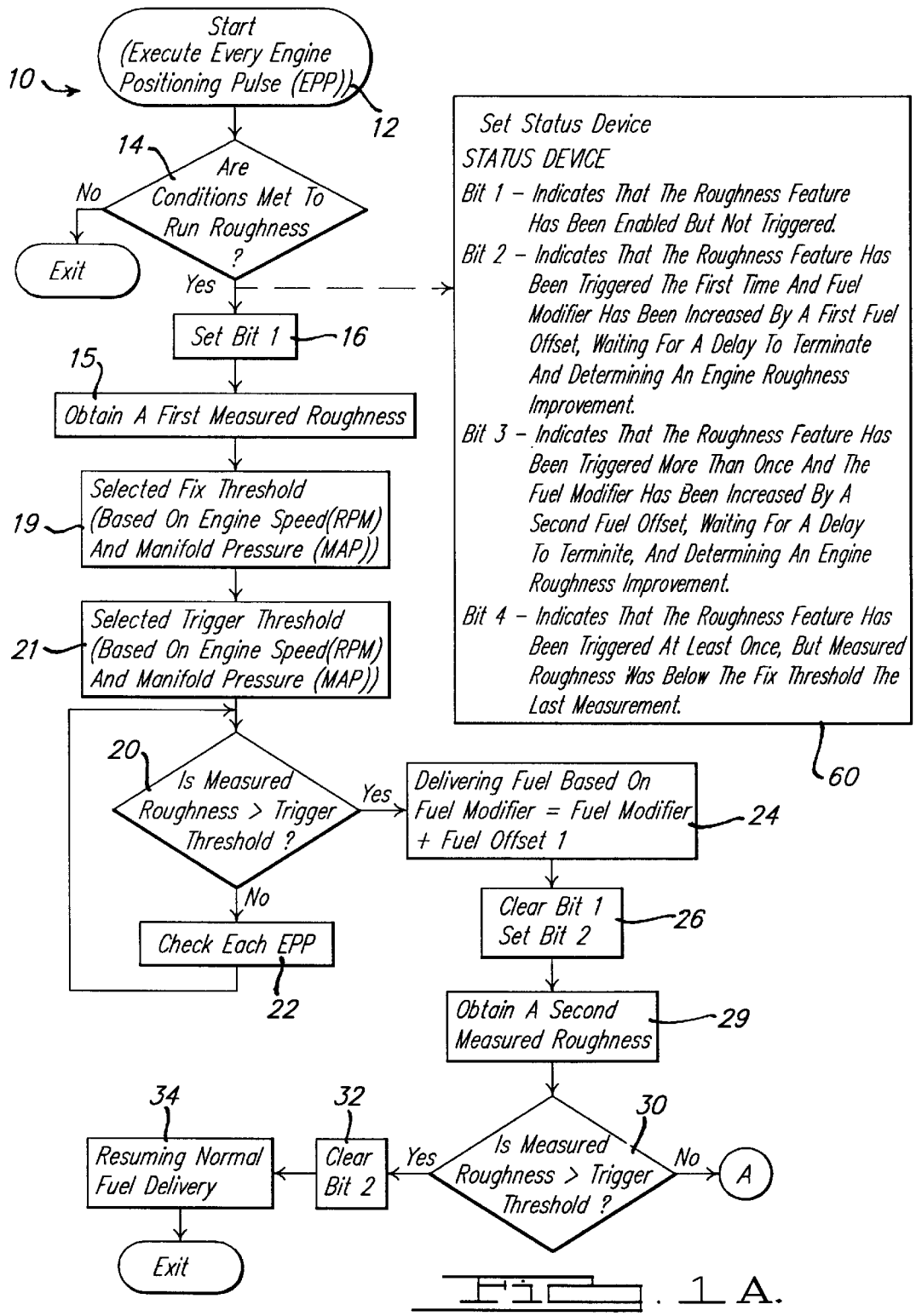
FIG. 1 is a flow chart of a method of using engine roughness to determine ethanol content for a flexible fuel compensation system of a flexible fueled vehicle.
Figure 1B:
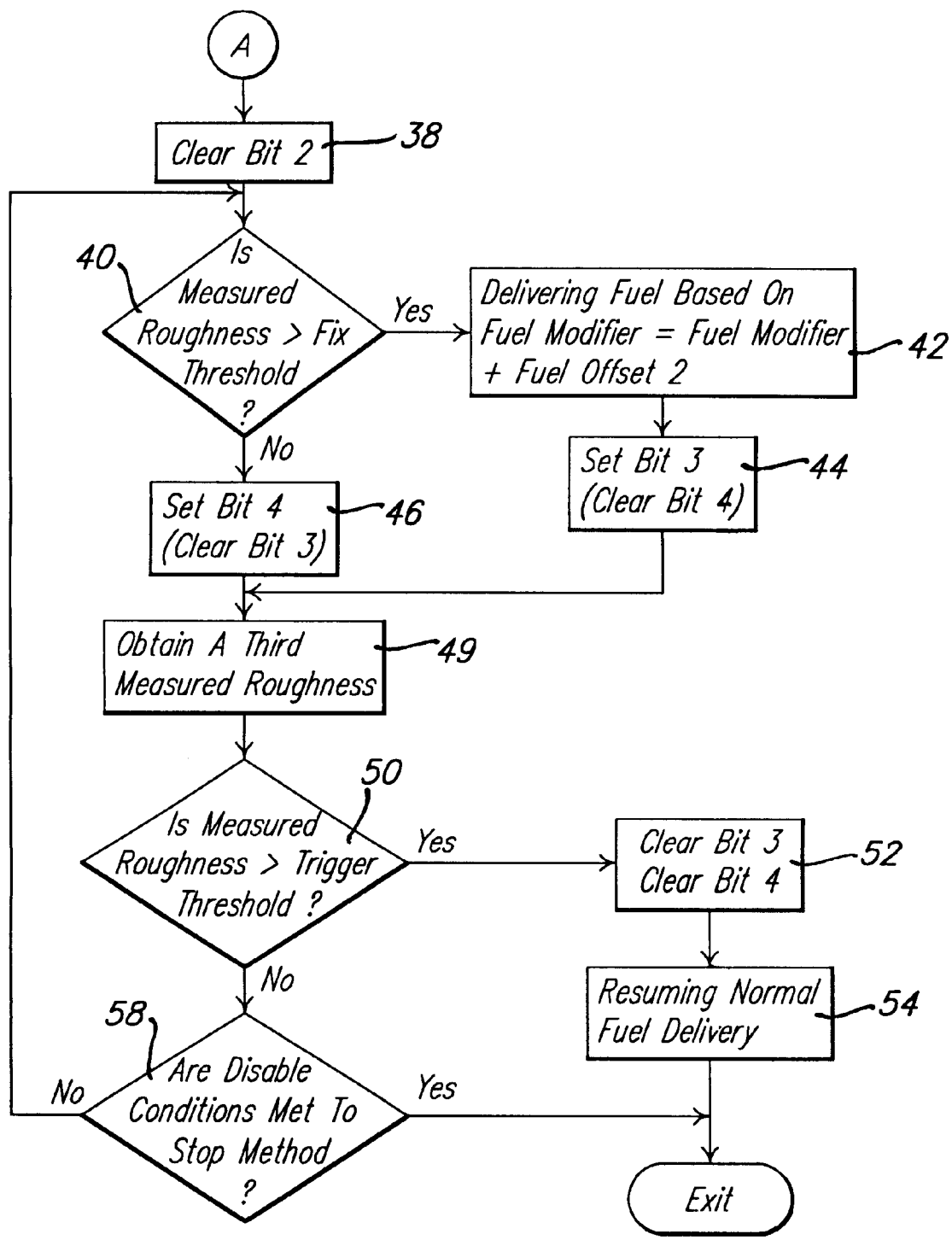

FIG. 1 shows a flow chart for the method of ethanol content learning based on engine roughness for a flexible fuel vehicle generally at 10. The frequency execution of the method is preferably every engine positioning pulse. This feature is activated for certain enable conditions. A determination of measured roughness, trigger threshold roughness (trigger threshold) and fixed threshold roughness (fix threshold) is preferably calculated every engine cylinder event beginning at the start-to-run transfer in which the engine is powered by combustion events. The measured roughness is preferably based on the second derivative of engine speed. The trigger threshold and the fix threshold are preferably based on manifold absolute pressure (MAP) and engine speed (RPM).

A measurement of the engine roughness is compared to the trigger threshold and the fix threshold. The trigger threshold is preferably greater than the fix threshold. Alcohol, for example, ethanol, is delivered to the fuel mixture based on a comparison of the measured roughness to the trigger threshold and to the fix threshold. A measured roughness greater than the trigger threshold causes ethanol to be added to the fuel mixture by an amount based on a first fuel offset. The first fuel offset delivers a first ethanol amount selected to compensate the fuel mixture and decrease the engine roughness to a value between the trigger threshold and the fix threshold. If the engine roughness decreases as a result of the ethanol delivered, then the engine roughness is improved by delivering ethanol. Consequently, additional amounts of ethanol are added if improvements in engine roughness are realized.

The additional amounts of ethanol added to the fuel mixture are an amount based on a second fuel offset if the measured roughness after the delivery of the first ethanol amount is less than the trigger threshold and greater than the fix threshold. The second fuel offset is preferably less than the first fuel offset because the measured roughness is an intermediate roughness—between the trigger threshold roughness and fix threshold roughness. The second fuel offset delivers a second ethanol amount selected to compensate the fuel mixture and decrease engine roughness to a value less than the fix threshold so that roughness is eliminated. It should be appreciated that the fuel offsets and corresponding delivered ethanol amount can be any selected quantity depending on the ethanol required to decrease engine roughness below the calculated trigger threshold and the fix threshold.

If the measured roughness responds to the delivery of the second ethanol amount then the measured roughness is continually sampled and compared to the trigger threshold and the fix threshold until the method is exited under a disable condition.

Start indication block 12 indicates that decision block 14 is to be executed. Start indication block 12 occurs every engine positioning pulse (EPP). Decision block 14 determines whether enable conditions are present to continue to execute the method of the present invention. The enable conditions necessary to determine roughness can be selected from, for example, but not limited to, a fuel fill occurs, a previous fuel fill was gasoline or E0, an ethanol content has not been learned by an exhaust gas oxygen sensor feedback system, new fuel is delivered to the engine, coolant temperature is below a threshold coolant temperature, system has not gone closed loop based on an exhaust gas oxygen sensor, and a start-to-run transfer of the engine is complete. Block 58 exits the method if the enable conditions are not met. If enable conditions do not exist then the method is exited. Block 60 sets a status device, if enable conditions exist. In the preferred embodiment, the status device is preferably a four bit digital counter which indicates the current execution status of the method according to the present invention. The status device prevents premature exiting before an improvement determination can be made. Bit 1 indicates that the roughness feature has been enabled but not triggered. Bit 2 indicates that the roughness feature has been triggered for the first time when the measured roughness is greater than the trigger threshold, and the fuel modifier has been incremented by the first fuel offset (and a delay is occurring to determine if an improvement in roughness has occurred). Bit 3 indicates that the roughness feature has been activated more than once and the fuel modifier has been incremented by the second fuel offset (and a delay is occurring to determine if an improvement in roughness has occurred). If Bit 2 and Bit 3 are set, an oxygen sensor warm up timer (not shown) coupled to the status device, prevents the warm up timer from decrementing to zero. Bit 4 indicates that the roughness feature has been triggered once and the measured filter roughness is less than the fix threshold. If the method is exited, then Bit 1, Bit 2, Bit 3, and Bit 4 are cleared.

Block 16 indicates via the status device 60 that the method has been enabled but not triggered, if the enable conditions are met. Block 15 obtains the measured roughness. A measured roughness is obtained preferably after a delay which allows any change of the amount of fuel delivered to affect the engine roughness or output. In particular, the first fuel offset is based on the measured engine roughness. The measured engine roughness is used to determine an estimation of the fuel-to-air ratio; accordingly, the first fuel offset is then selected based on improving the lower than desired estimation of the fuel-to-air ratio so that lean operation can be mitigated. Block 19 selects a trigger threshold based on engine speed of revolutions per minute (RPM) and manifold absolute pressure (MAP). Block 21 selects a fix threshold based on engine speed (RPM) and manifold absolute pressure (MAP). Both the trigger threshold and fix threshold are provided for particular RPMs and MAPs and are based on a percentage of a surface value measured roughness. In particular, the surface value measured roughness is a computed measured roughness with a fixed misfire rate of, for example, but not limited to, twenty-five percent, and determined from a surface value calculated and based on the MAP and RPM. By way of example, the trigger threshold can be one hundred percent of the surface value measured roughness; and the fix threshold can be seventy-five percent of the surface value measured roughness. Iteration block 20 determines whether the measured roughness is greater than the trigger threshold. If the measured roughness is less than the trigger threshold, then a comparison is performed every engine positioning pulse, as indicated by block 22. If the measured roughness is greater than the trigger threshold, then the measured roughness is considered a result of lean operation that occurs during transition of the old fuel to the new fuel in the fuel system. Fuel can only exit the fuel system through the engine. Consequently, if new fuel is added to the tank, the old fuel is purged out of the fuel line and into the engine until the engine completely operates on new fuel and the final fuel value is achieved. The final fuel value is the desired amount of fuel that allows stoichiometric operation and eliminates engine roughness. However, during the transition from old fuel to new fuel, a blend of the old and new fuel occurs in the engine. For example, if the old fuel is E0 and the new fuel is E85, then the fuel will blend into an air/fuel mixture consisting of E0 and E85; however, the air/fuel mixture will not be the desired final fuel value for a stoichiometric mixture of E85 and, therefore, will cause roughness to increase. However, delivering a first fuel offset of a first incremental amount of ethanol (E85) to the engine during the blending, mitigates roughness by adding fuel delivery, consequently decreasing the air/fuel mixture, and assisting in blending to the desired final fuel value.

With a continued reference to FIG. 1, block 24 increments the fuel modifier by a first fuel offset. A first fuel offset of ethanol incrementally modifies the amount of normal fuel delivery to the fuel system and diminishes lean operation, and therefore engine roughness. The first fuel offset is preferably selected to decrease engine roughness from the measured roughness which is above the trigger threshold to below the fix threshold. That is, the first fuel offset is selected to remove engine roughness to below the fix threshold. The fuel modifier allows continuous delivery of fuel to the engine and can be incremented or decremented based on the fuel offset to vary the total amount of fuel delivered to the engine. Block 26 indicates that the roughness feature has been triggered the first time, the fuel modifier has been increased by a first fuel offset, and the method is waiting for a delay to terminate and determining whether there is an engine roughness improvement. Block 29 obtains a second measured roughness. The engine roughness is preferably measured after a delay which allows any change of the amount of fuel delivered to affect the engine roughness. Decision block 30 compares the second measured roughness to the trigger threshold. If the measured roughness is greater than the trigger threshold, then the engine roughness is presumably not caused by an ethanol deficiency. Block 32 clears the status device 60 according to the conditions. Block 34 resumes normal fuel delivery and the method is exited. By way of example, normal fuel delivery is obtained by decrementing the fuel modifier by the first fuel offset if the only modifications to the fuel modifier was an increment by the first fuel offset. The decrement to the fuel modifier stops the delivery of the incremented amount of fuel based on the assumption that an increase in ethanol by the first fuel offset did not decrease roughness. Rather, the engine roughness could be caused by another problem, for example, a defective spark plug.

If the second measured roughness is not greater than the trigger threshold, then block 38 clears the status device 60 according to the conditions. Decision block 40 determines if the second measured engine roughness is greater than the fix threshold. If the measured roughness is greater than the fix threshold, then the engine roughness is presumably caused by an ethanol deficiency. Block 42 increments the fuel modifier by the second fuel offset. Consequently, an amount of fuel based on the second fuel offset is continually delivered to the engine. The second fuel offset preferably causes a change in the amount of ethanol to be delivered which is less than the change based on the first fuel offset of the amount of fuel delivered. The second fuel offset is similar to the first fuel offset, in that the second fuel offset incrementally modifies the amount of fuel delivery to the fuel system; however, the second fuel offset is preferably an amount to decrease engine roughness from the trigger threshold to below the fix threshold. That is, the second fuel offset is selected to remove engine roughness, but based on the need to decrease the measured roughness from no more than the trigger threshold to below the fix threshold. In particular, the second fuel offset is based on the measured roughness. The measured roughness is used to determine an estimation of the fuel-to-air ratio. Accordingly, the second fuel offset is then selected based on how low the fuel-to-air ratio is estimated. Block 44 indicates via the status device 60 that the roughness feature has been triggered more than once and the fuel modifier has been increased by a second fuel offset, waiting for a delay to terminate, and determining whether there is an engine roughness improvement.

If the second measured roughness is not greater than the fix threshold, then block 46 indicates via the status device 60 that the roughness feature has been triggered at least once, but measured roughness was below the fix threshold the last measurement. Block 49 obtains a third measured roughness. The engine roughness is preferably measured after a delay which allows any change of the amount of fuel delivered to affect engine roughness. Decision block 50 determines if the third measured roughness is greater than the trigger threshold. Block 52 indicates via the status device that adding ethanol to the engine is not improving roughness conditions, if the third measured roughness is greater than the trigger threshold. If the third measured roughness is above the trigger threshold, then there may be another cause of engine roughness besides an ethanol deficiency. Although an improvement in the engine roughness occurred in the past based on delivery of ethanol, a spark plug or the fuel injector may be defective so that further ethanol delivery will not alleviate the engine roughness. Block 54 resumes normal fuel delivery and the method is exited because presumably the concentration of ethanol in the fuel mixture is not the cause of engine roughness. In the preferred embodiment, to resume normal fuel delivery, the fuel modifier is decremented by the first fuel offset, the second fuel offset, and any additional second fuel offsets that may have been added during the execution of the method.

If the third measured roughness is not greater than the trigger threshold and decision block 58 determines no disable conditions exist, then block 40 is executed and the method continues to check the measured roughness. Decision block 58 exits the method if disable conditions exist. Disable conditions include, but are not limited to, closed loop engine fueling occurs based on exhaust gas oxygen sensor, accumulated fuel delivered is greater than a predetermined value (and the feature is not active and waiting for an improvement based on the delivery of ethanol), an oxygen sensor warm up timer times out (and the feature is not active and waiting for an improvement based on the delivery of ethanol), and coolant temperature is greater than a predetermined value (and the feature is not active and waiting for an improvement based on the delivery of ethanol). If the roughness responds to the delivery of a fuel modifier increased by the second ethanol amount, then the roughness is continually sampled and compared to the trigger threshold and the fix threshold, and delivery of ethanol is modified and provided accordingly, until disable conditions occur or the method is exited.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for ethanol content learning based on engine roughness comprising the steps of:
    establishing a trigger threshold based on engine speed and manifold pressure;
    establishing a fix threshold based on engine speed and manifold pressure;
    obtaining a first measured engine roughness;
    incrementing fuel delivery by a first ethanol amount if a first measured roughness is greater than said trigger threshold;
    obtaining a second measured engine roughness after incrementing fuel delivery by said first ethanol amount;
    decrementing fuel delivery by said first ethanol amount if said second measured roughness is greater than said trigger threshold;
    incrementing fuel delivery by a second ethanol amount if said second measured roughness is not greater than said trigger threshold but greater than said fix threshold;
    obtaining a third measured roughness after incrementing fuel delivery by a second ethanol amount; and
    decrementing said fuel delivery by said second ethanol amount if said third measured roughness is greater than said trigger threshold.

2. The method of claim 1 wherein said first ethanol amount is based on decreasing engine roughness from above said trigger threshold to below said fix threshold.

3. The method of claim 1 wherein said second ethanol amount is based on decreasing engine roughness from below said trigger threshold to below said fix threshold.

4. The method of claim 1 wherein said first fuel offset is different than said second fuel offset.

5. The method of claim 1 further comprising setting a status device for indicating a status of said method.

6. The method of claim 1 further comprising continuing to sample roughness measurements if disable conditions are inactive.

7. The method of claim 1 further comprising waiting for a delay prior to obtaining each of said first, second and third measured engine roughness, whereby any change of fuel delivered affects said engine roughness.

8. The method of claim 1 wherein said first ethanol amount and said second ethanol amount are based on an estimation of a fuel-to-air ratio determined by measuring engine roughness.

9. A method for ethanol content learning based on engine roughness comprising the steps of:

establishing a trigger threshold based on engine speed and manifold pressure;

establishing a fix threshold based on engine speed and manifold pressure;

obtaining a first measured roughness;

incrementing fuel delivery by a first amount based on a first estimated fuel-to-air ratio;

obtaining a second measured roughness after incrementing fuel delivery;

resuming normal fuel delivery if said second roughness is greater than the trigger threshold;

incrementing fuel delivery by a second amount based on a second estimated fuel-to-air ratio if said second measured roughness is not greater than said trigger threshold and greater than said fix threshold;

obtaining a third measured roughness after incrementing fuel delivery by a second ethanol amount; and incrementing again said fuel delivery by said second ethanol amount if said third measured roughness is less than said trigger threshold but greater than said fix threshold.

10. The method of claim 9 wherein the trigger threshold is a percentage of a determined roughness based on engine speed and manifold air pressure.

11. The method of claim 9 wherein the fix threshold is a percentage of a determined roughness based on engine speed and manifold air pressure.

12. A method for ethanol content learning based on engine roughness comprising the steps of:

establishing a trigger threshold based on engine speed and manifold pressure;

establishing a fix threshold based on engine speed and manifold pressure;

determining a first measured roughness;

monitoring measured roughness if measured roughness is less than a trigger threshold;

incrementing a fuel modifier by a first fuel offset if said engine roughness is greater than said trigger threshold;

determining a second measured roughness after incrementing said fuel modifier by said first fuel offset;

resuming normal fuel delivery by adjusting said fuel modifier and exiting said method if said second measured roughness is greater than said trigger threshold;

incrementing said fuel modifier by a second fuel offset if said second measured roughness is greater than a fix threshold;

determining a third measured roughness;

resuming normal fuel delivery by adjusting and exiting said method if said third measured roughness is greater than said trigger roughness;

re-incrementing said fuel modifier by said second fuel offset if said third measured roughness is less than said trigger roughness and is greater than said fix threshold; and maintaining said fuel modifier at a current value if said third measured roughness is less than said trigger roughness and is less than a fix threshold.

13. The method of claim 12 wherein said trigger threshold is based on engine speed and manifold pressure.

14. The method of claim 12 wherein said fix threshold is based on engine speed and manifold pressure.

15. The method of claim 12 wherein said first fuel offset is based on decreasing engine roughness below trigger threshold.

16. The method of claim 12 wherein said second fuel offset is based on decreasing engine roughness below a fix threshold.

* * * * *